United States Patent
Rollins et al.

(10) Patent No.: US 8,031,059 B2
(45) Date of Patent: Oct. 4, 2011

(54) COMMUNICATION SYSTEM

(75) Inventors: Thomas James Rollins, Boynton Beach, FL (US); Bruce McKay Morton, Snohomish, WA (US)

(73) Assignee: Motorola Mobility, Inc., Libertyville, IL (US)

( * ) Notice: Subject to any disclaimer, the term of this patent is extended or adjusted under 35 U.S.C. 154(b) by 1944 days.

(21) Appl. No.: 10/160,590

(22) Filed: May 31, 2002

(65) Prior Publication Data

US 2003/0222766 A1 Dec. 4, 2003

(51) Int. Cl.
*H04B 3/36* (2006.01)
*G08B 1/08* (2006.01)

(52) U.S. Cl. ............... 340/407.1; 340/539.1; 455/412.1
(58) Field of Classification Search ............... 340/407.1, 340/384.1, 384.6, 384.7; 455/403, 418, 419
See application file for complete search history.

(56) References Cited

U.S. PATENT DOCUMENTS

| | | | |
|---|---|---|---|
| 4,931,765 A | 6/1990 | Rollins et al. | |
| 5,172,092 A | 12/1992 | Nguyen et al. | |
| 5,528,697 A | 6/1996 | Saito | |
| 5,619,181 A | 4/1997 | Murray | |
| 6,198,206 B1 * | 3/2001 | Saarmaa et al. | 310/340 |
| 6,259,935 B1 * | 7/2001 | Saiki et al. | 455/567 |
| 6,366,791 B1 * | 4/2002 | Lin et al. | 455/567 |
| 6,859,650 B1 | 2/2005 | Ritter | |
| 2001/0023197 A1 | 9/2001 | Shibata | |
| 2002/0061772 A1 | 5/2002 | Hayashi | |
| 2003/0114150 A1 * | 6/2003 | Hayashi | 455/418 |
| 2004/0204149 A1 | 10/2004 | Kaneda et al. | |
| 2005/0036636 A1 | 2/2005 | Noro et al. | |

FOREIGN PATENT DOCUMENTS

| | | | |
|---|---|---|---|
| CN | 1295396 A | | 5/2001 |
| EP | 0688125 A1 | | 12/1995 |
| JP | 2001268171 | * | 9/2001 |
| JP | 2001268171 A | * | 9/2001 |
| JP | 02001268171 A | * | 9/2001 |
| JP | 2001-379521 | * | 12/2001 |
| JP | 02002300231 A | * | 10/2002 |
| JP | 2003179668 A | | 6/2003 |
| WO | 9961966 A2 | | 12/1999 |

(Continued)

OTHER PUBLICATIONS

CD Clock Radio ICR-CD820/CD825RM (1998).*
The State Intellectual Property Office of the People'S Republic of China, "Notification of the First Office Action" for Chinese Pat. Appln. No. 03812625.7, Feb. 13, 2009, pp. 1-21.

(Continued)

*Primary Examiner* — Julie Lieu
(74) *Attorney, Agent, or Firm* — Philip Premysler; Sylvia Chen

(57) ABSTRACT

A system (100) for communicating multimedia messages includes a multimedia message server (102) that is operable to transmit (1404, 1406, 1408) visual media, a vibration melody (1200), and an audio segment (1300) that is preferably filtered (1402) to exclude frequencies of the vibration melody (1200) through a network (104) to a client device (106), and is operable to, preferably at a later time, to transmit instructions (1410) to the client device (106) to output the vibration melody (1200), audio segment (1300) and visual media. At the client device, (106) the audio segment (1300) and the vibration melody (1200) and visual media are preferably stored (1504, 1508, 1512) in a memory (608) and in response to the instruction signal are read (1616, 1518, 1520) from the memory (608), decoded (1522, 1524, 1526) and output (1528, 1530, 1532) to a user. The vibration melody (1200) and the audio segment (1300) are preferably applied at least partially concurrently applied to an electromechanical transducer (212).

13 Claims, 8 Drawing Sheets

FOREIGN PATENT DOCUMENTS

| WO | 0049791 A1 | 8/2000 |
| WO | WO 01/28699 A1 | 4/2001 |
| WO | 0133803 A1 | 5/2001 |

OTHER PUBLICATIONS

The State Intellectual Property Office of the People'S Republic of China, "Notification of the Second Office Action" for Chinese Pat. Appln. No. 03812625.7, Aug. 14, 2009, Feb. 13, 2009, pp. 1-21.

National Board of Patents and Registration in Finland, "Official Action" for Finland Pat Appln. No. 20041535, Mar. 20, 2007; pp. 1-5.

Patent Cooperation Treaty, "Notification of Transmittal of the International Search Report" for International Application No. PCT/US2003/15787, Oct. 17, 2003, pp. 1-4.

The Patent Office, "Examination Report" for Great Britain Patent Application No. GB0426871.0, Jun. 23, 2005, pp. 1-5.

\* cited by examiner

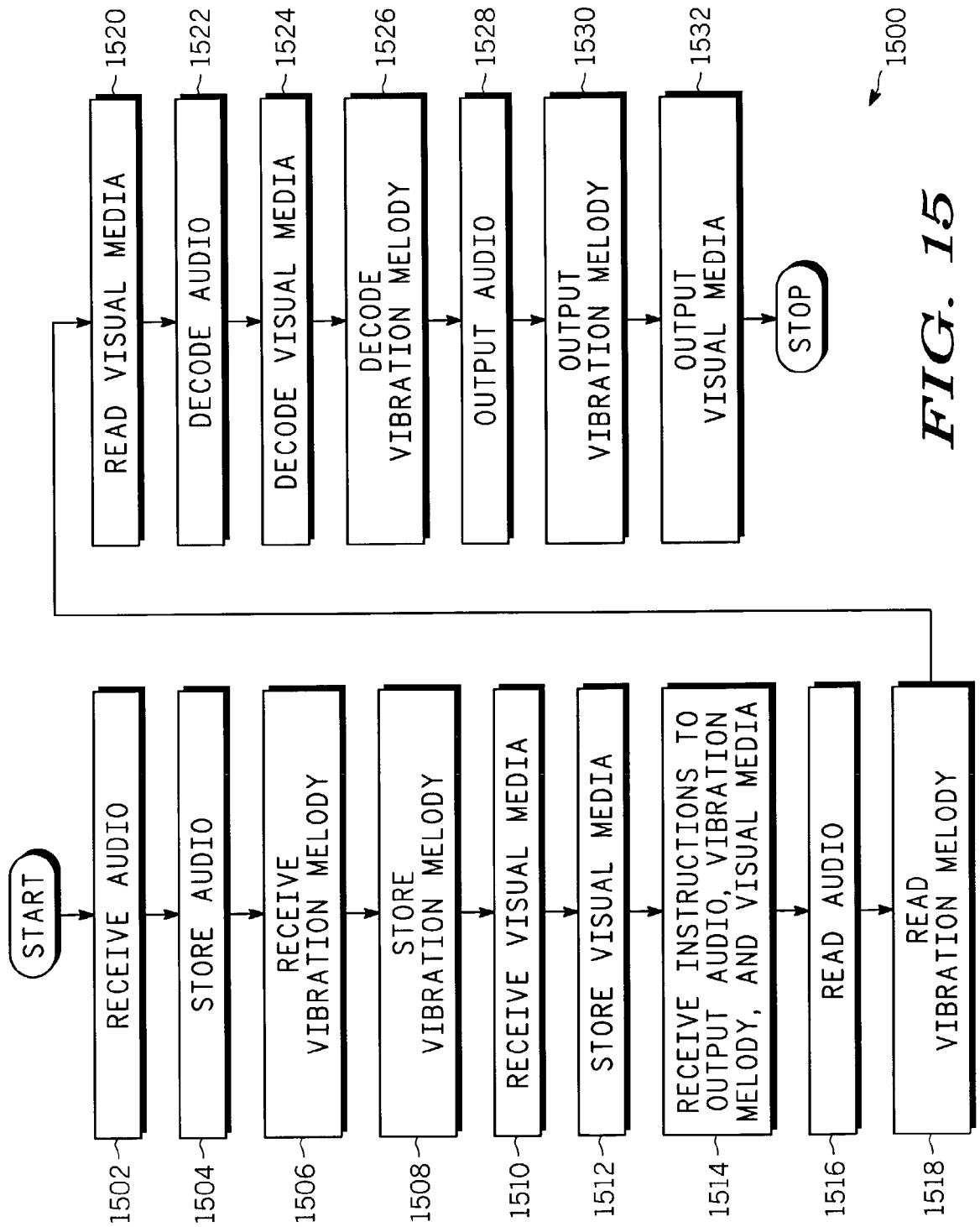

COMMUNICATION SYSTEM

BACKGROUND OF THE INVENTION

1. Field of the Invention

This invention relates in general to electronic communication and particularly to electronic communication for multimedia applications.

2. Description of Related Art

Recently there has been a proliferation of a variety of wirelessly connected portable devices. As the computing power, and bandwidth provided to portable devices increases, it is expected that they will handle an increasing proportion of the computing and communication tasks that are at present handled by personal computers.

The quality and volume of audio produced by portable devices is limited due to space constraints on their audio components. The display size of portable devices is also limited compared to personal computer displays.

The limitations of the audio and displays of portable devices, tends to limit the impact of multimedia messages received through portable devices.

One area in which it is important to achieve high levels of audio and visual impact is in advertising. Advertisements transmitted through the World Wide Web (WWW) and viewed on personal computers can include audio, dynamic images, and video.

BRIEF DESCRIPTION OF THE DRAWINGS

The present invention will be described by way of exemplary embodiments, but not limitations, illustrated in the accompanying drawings in which like references denote similar elements, and in which:

FIG. 15 is a flow chart of a process performed by the wireless client device shown in FIGS. 2-3, 6 according to the preferred embodiment of the invention.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Figure 1:
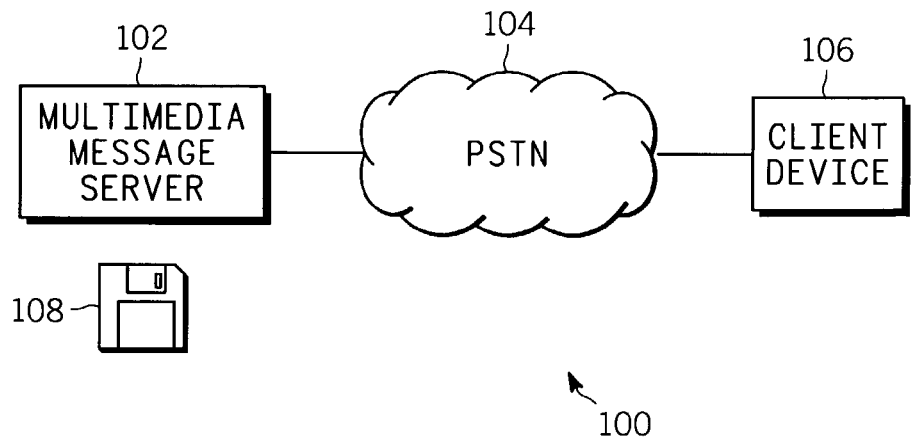
FIG. 1 is a block diagram of system for communicating multimedia messages according to the preferred embodiment of the invention.

FIG. 1 is a block diagram of system 100 for communicating multimedia messages according to the preferred embodiment of the invention. The system 100 comprises multimedia message server 102, coupled through a network 104 to a client device 106. A computer readable medium 108 is provided for loading software onto the multimedia message server 102 for configuring the multimedia message server 102 to perform functions described below including those described with reference to the flow chart shown in FIG. 14.

The multimedia message server 102 can for example comprise an IBM compatible personal computer. The network 104 can for example comprise the Internet, and preferably includes a wireless link to the client device 106. Data traveling from the multimedia message server 102 to the client device 106 can traverse a plurality of disparate mediums including for example fiber optics, twisted pairs, and free space. Data can be handled by one or more communication protocols within different parts of the network 104.

The system 100 is used to transmit multimedia messages that include vibration melodies to the client device 106. As used herein the term vibration melody denotes a complex sequence of vibrations designed to stimulate a user's attention.

Figure 2:
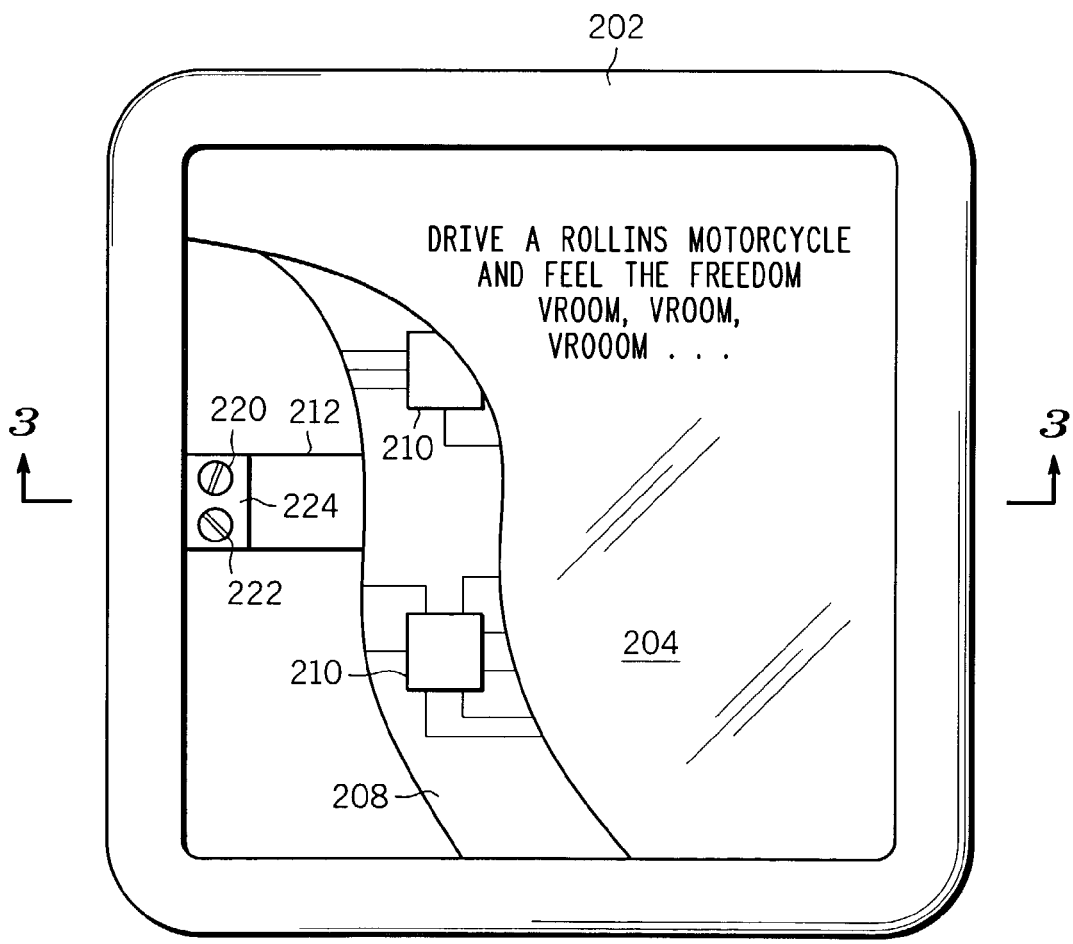
FIG. 2 is a partial cut away top view of a wireless client device according to the preferred embodiment of the invention.
Figure 3:
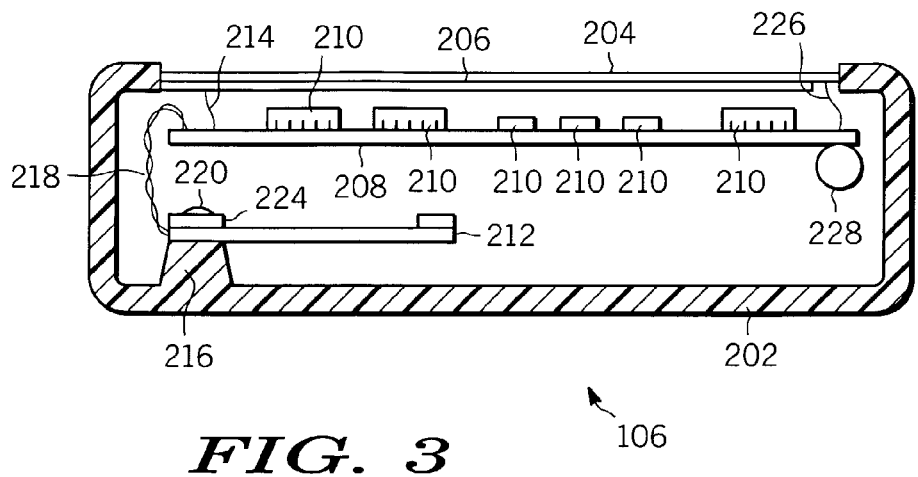
FIG. 3 is a sectional elevation view of the wireless client device shown in FIGS. 2, 6.

FIG. 2 is a partial cut away top view of the wireless client device 106 according to the preferred embodiment of the invention and FIG. 3 is a sectional elevation view of the wireless client device 106 as shown in FIG. 2. The wireless client device 106 shown in FIGS. 2-3 comprises a wirelessly connected personal communication device. The wireless client device 106 includes a housing 202 that supports a touch screen 204, over a flat panel display 206 (e.g., a liquid crystal display). A printed circuit board 208 is enclosed within the housing 202. The circuit board 208 supports and electrically couples a plurality of electric circuit components 210, forming one or more electrical circuits. A first electrical coupling 226 connects circuits on the printed circuit board 208 to the touch screen 204, a second electrical coupling 214 connects circuits on the printed circuit board 208 to the display 206. An antenna 228 is electrically coupled to printed circuit board 208.

A piezoelectric electromechanical transducer 212 is mounted on a mounting boss 216 of the housing 202 of the wireless client device 106. Two screws 220, 222 and a clamping plate 224 are used to clamp the electromechanical transducer 212, to the mounting boss 216. A twisted pair of leads 218 connects the electromechanical transducer 212 to circuits on the printed circuit board 208. Alternatively, another type of electrical connection can be used in lieu of the twisted pair of leads 218, such as for example spring contacts, or an elastomeric connection.

The piezoelectric electromechanical transducer 212 is used to output vibration melodies. Preferably, the piezoelectric electromechanical transducer 212 is also used to, at least partially concurrently, output audio segments. Audio segments can for example include spoken words and/or music. The piezoelectric electromechanical transducer 212 is especially suited to outputting both audio segments and vibration melodies because it has a sufficiently strong response at a relatively low frequency that is suitable for generating perceptible vibrations (e.g., at a frequency in the range of about 1 to 250 hertz) and it has a broad frequency response that allows it to output audio. Strong frequency response at the relatively low frequency is preferably obtained by designing the piezoelectric electromechanical transducer 212 so that it is resonant at or near the relatively low frequency of the vibration melodies.

The display 206 is used to output visual media. The visual media preferably includes text, and images, and alternatively comprises video. The visual media is preferably part of a multimedia message that includes a vibration melody, and preferably also includes an audio segment.

Figure 4:
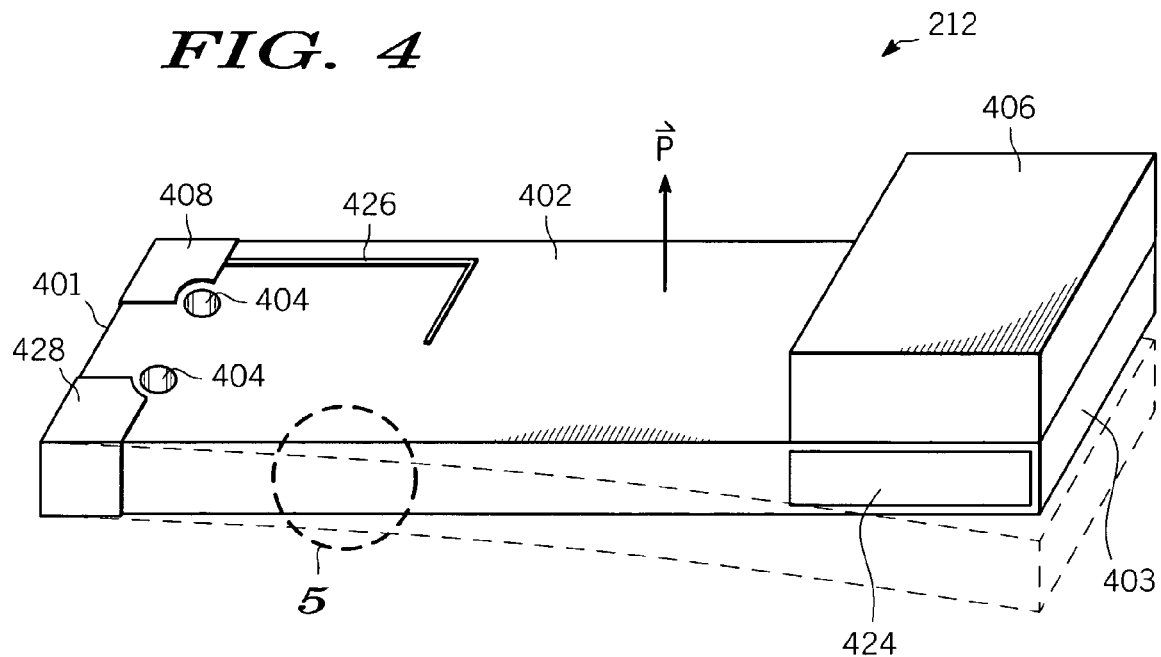
FIG. 4 is a perspective view of a piezoelectric electromechanical transducer used in the wireless client device shown in FIGS. 2-3, 6 according to the preferred embodiment of the invention.
Figure 5:
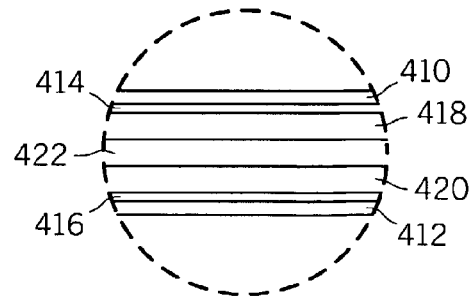
FIG. 5 is a magnified portion of the piezoelectric electromechanical transducer shown in FIG. 4.
Figure 6:
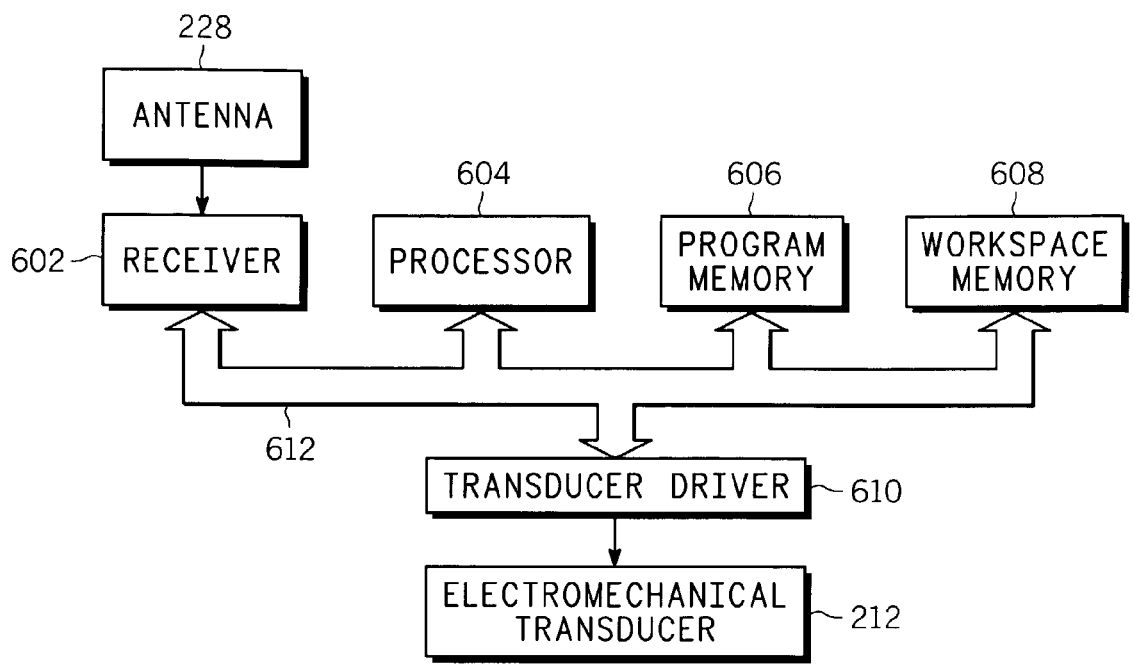
FIG. 6 is a block diagram of the wireless client device shown in FIGS. 2, 3 according to the preferred embodiment of the invention.

FIG. 4 is a perspective view of the piezoelectric electromechanical transducer 212 used in the wireless client device 106 shown in FIGS. 2-3, 6 according to the preferred embodiment of the invention and FIG. 5 is a magnified portion of the piezoelectric electromechanical transducer 212 shown in FIG. 4. The transducer 212 includes a flat beam piezoelectric motor 402. A first end 401 of the flat beam 402 is provided with two through holes 404 that are used to mount the transducer 212 on the mounting boss 216. A mass 406 is supported at a second end 403 of the beam 402. The second end 403 of the beam 402 is free to move. A first electrical contact 408, and a second electrical contact 428 are located proximate the first end 401 of the beam 402. Twisted pair leads 218 (not shown in FIG. 4) are soldered to the first and second contacts 408, 428. As mentioned above other types of electrical connections can be used in lieu of the twisted pair of leads 218.

The beam 402 includes a plurality of layers as will be described presently. A first outer mylar layer 410 forms one side of the beam 402, and a second outer mylar layer 412 forms an opposite side of the beam 402. A first silver film layer 414, and a second silver film layer 416 are located between the first and second mylar layers 410, 412. A first piezoelectric layer 418 and a second piezoelectric layer 420 are located between the first and second silver film layers 414, 416. A brass shim 422 is located between the first and second piezoelectric layers 418, 420. The recited layers are bonded together using heat cured epoxy. The recited layered structure preferable extends over a middle portion of the beam 402. The layered structure need not extend under the mass 406 or to the first end 401. A brass plate 424 is preferably located between the first and second outer mylar layers 410, 412 underneath the mass 406. The first and second piezoelectric layers 418, 420 are preferably polarized parallel to each other and perpendicular to the top and bottom major surfaces of the beam 402. A possible polarization direction is indicated by a vector labeled P. The first and second silver film layers 414, 416 are preferably electrically connected to the first electrical contact 408 by a first metallization trace 426, and a second metallization trace (not shown) that run between the outer mylar layers 410, 412 and the silver film layers 414, 416. Such metallization traces 426 can be deposited on the outer mylar layers 410, 412. The brass shim 422 is preferably electrically connected to the second electrical contact 428. The brass shim 422 along with the first and second silver film layers 414, 416 serve as planar electrodes for applying electric fields to the piezoelectric layers 418, 420.

If the first electrical contact 408 is coupled to a first pole of a DC signal source, and the second electrical contact 428 is connected to a second pole of the DC signal source, oppositely directed electric fields will be established in the first and second piezoelectric layers 418, 420. Such oppositely directed fields will induce one of the piezoelectric layers 418, 420 to expand, and the other of the piezoelectric layers 418, 420 to contract. The simultaneous expansion of one of the piezoelectric layers 418, 420 and contraction of the other of the piezoelectric layers 418, 420, will cause the beam 402 to bow, and the mass 406 to be displaced perpendicularly with respect to the length of the beam 402. A somewhat exaggerated depiction of the deflected beam 402, without the mass 402, is shown by shadow lines. If the polarity of the signal source coupled to the first and second electrical contacts 408, 410 is reversed, the beam 402 will deflect in an opposite sense. By applying AC signals to the transducer 212, the transducer 212 is caused vibrate. The mass 406 is used to set a resonance of the transducer 212 at a frequency that is suitable for generating perceptible vibrations. By driving the transducer 212 with a signal that is close to or equal to a resonant frequency of the transducer 212, the transducer 212 will be caused to vibrate at a sufficient amplitude that the vibrations are perceptible to a user carrying the wireless client device 106 in their hand, or pocket, or attached to a belt, etc. By driving the transducer 212 with a vibration melody, the transducer 212 is caused to vibrate according to the vibration melody. The vibration melody preferably comprises an attention getting, and amusing sequence of vibrations. The vibration melody can be reminiscent of vibrations caused by other types of apparatus that are familiar from daily life. For example the vibration melody can mimic the revving of a motorcycle. Such a vibration melody would have a high impact when used in a multimedia advertisement for a motorcycle that is transmitted to the client device 106. By driving the transducer 212 with audio signals, the transducer 212 will be cause to emit sound (e.g., music, voice).

According to an alternative construction of the transducer 212, the shim 422 is eliminated, the piezoelectric layers 416, 418 are given opposite polarizations, the first silver film layer 414 is connected to the first electrical contact 408, and the second silver film layer 416 is connected to the second electrical contact 428. Given such an alternative construction, a given electrical potential established between the first and second silver film layers 414, 416 would lead to opposite stresses being established in the piezoelectric layers 416, 418 such that the alternative transducer would be operable in the manner previously described for outputting vibration melodies and acoustic segments.

FIG. 6 is a block diagram of the wireless client device 106 shown in FIGS. 2-3 according to the preferred embodiment of the invention. As shown in FIG. 6, the client device 106 comprises a receiver 602, a processor 604 (e.g., a digital signal processor), a program memory 606, a workspace memory 608, and a transducer 610 coupled together through a digital signal bus 612. The receiver 602 serves to receive multimedia message data including vibration melodies, and preferably also including audio segments, and visual media. The receiver 602 is coupled to the antenna 228. A transmitter (not shown) can also be included.

The processor 604 is preferably used to execute programs for decoding the multimedia message data, and controlling the operation of the client device 106. The program memory 606 is used to store programs used to decode multimedia message data, and to control the operation of the client device 106. The program memory 606 is a form of computer readable medium. FIG. 15 below illustrates a process performed by the client device 106 that can be embodied in the form a program that is stored in the program memory 606. Other forms of computer readable media can alternatively be used instead of the program memory 606. The workspace memory 608 is preferably used to temporarily store encoded and/or decoded forms of multimedia message data received by the receiver 602. Audio segments, and visual media are preferably encoded in a compressed file format. Decoding is preferably performed by the processor 604, and decoded forms of the audio segments and visual media are preferably temporarily stored in the workspace memory 608. Visual media can for example be encoded using JPEG encoding, and audio segments can for example be encoded using MP3 encoding. The transducer driver 610 is coupled to the electromechanical transducer 212.

The receiver 602, the processor 604, the program memory 606, the workspace memory 608, and the transducer driver 610 are embodied in the electrical circuit components 210, and interconnections of the printed circuit board 208. Two or more of the blocks shown in FIG. 6 can be implemented as a single integrated circuit and/or each of the blocks shown in FIG. 6 can be implement as one or more integrated circuits. Discrete components can also be used to implement the blocks shown in FIG. 6.

Figure 7:
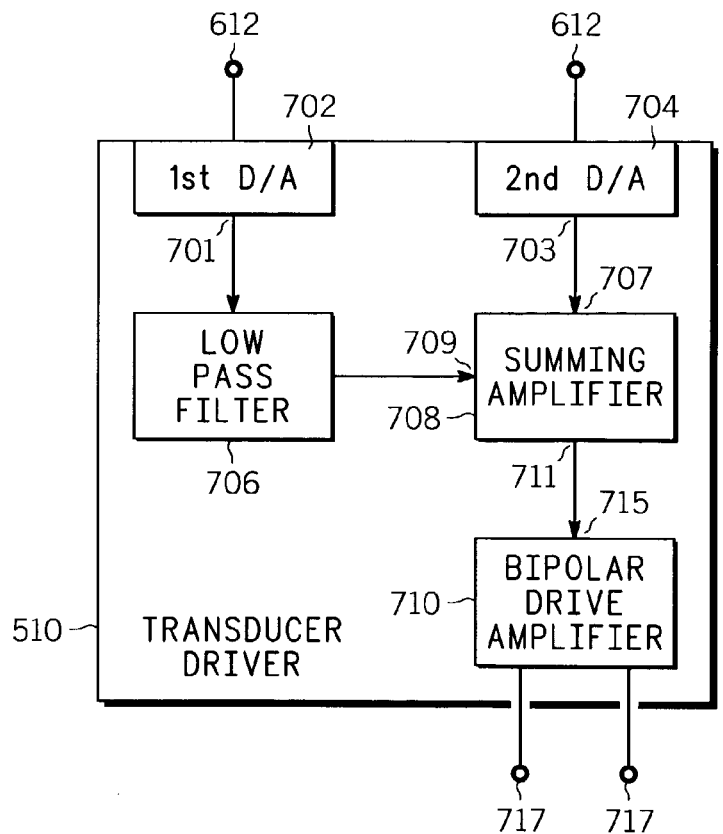
FIG. 7 is a block diagram of a transducer driver used in the wireless client device shown in FIGS. 2-3, 6 according to the preferred embodiment of the invention.

FIG. 7 is a block diagram of a transducer driver 610 used in the wireless client device shown in FIGS. 2-3, 6 according to the preferred embodiment of the invention. As shown in FIG. 7, the transducer driver 610 comprises a first digital to analog converter 702, and a second digital to analog converter 704, that are electrically coupled to the digital signal bus 612. The first digital to analog converter 702 preferably receives successive samples of a decoded vibration melody at at least about a Nyquist rate of a highest frequency of the vibration melody. An output 701 of the first digital to analog converter 702 is coupled through a low pass filter 706 to a first input 709 of a summing amplifier 708. The low pass filter 706 serves to smooth an output of the first digital to analog converter 702. Preferably, the successive samples of the vibration melody include more than two signal levels, and samples are received at a rate that exceeds the Nyquist rate of the vibration melody.

The second digital to analog converter 704 receives successive samples of a decoded audio segment. An output 703 of the second digital to analog converter 704 is coupled to a second input 707 of the summing amplifier 708. The summing amplifier 708 sums the vibration melody and the audio segment and outputs a sum signal at a summing amplifier output 711.

The summing amplifier output 711 is coupled to an input 715 of a bipolar drive amplifier 710. The bipolar drive amplifier 710 includes a pair of outputs 717 that are coupled to the twisted pair of leads 218 (FIG. 2) that connect the printed circuit board 208 to the first 408 and second 428 terminals of the transducer 212.

Figure 8:
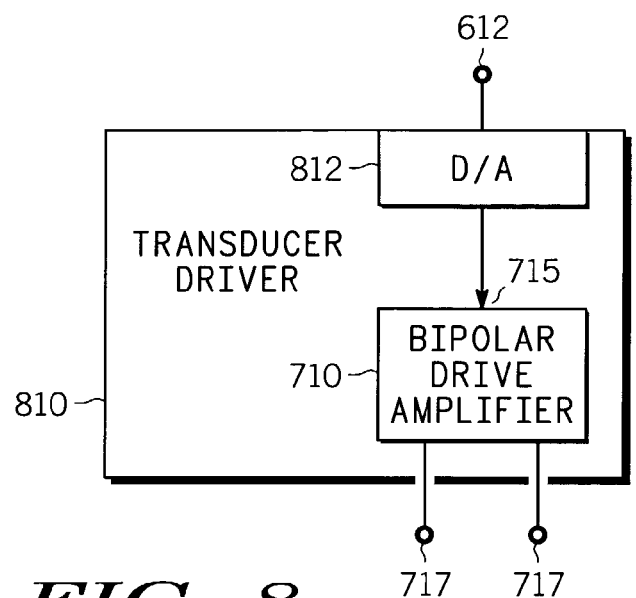
FIG. 8 is a block diagram of a transducer driver used in the wireless client device shown in FIGS. 2-3, 6 according to an alternative embodiment of the invention.

FIG. 8 is a block diagram of a transducer driver used in the wireless client device shown in FIGS. 2-3, 6 according to an alternative embodiment of the invention. In the context of FIG. 8 the transducer driver is indicated by reference numeral 810. As shown in FIG. 8, the transducer driver 810 includes a digital to analog converter 812 that is coupled to an input 715 of the bipolar drive amplifier 710. The transducer driver 810 shown in FIG. 8 is suitable for use in an alternative embodiment in which the vibration melody and the audio segment are summed while still in digital format and a digital representation of the combined vibration melody, and audio segment is input to the digital to analog converter 812.

Although block diagrams of two forms of transducer drivers 610, 810 for use in the invention have been presented in FIGS. 7, 8, other architectures that perform the functions of the transducer driver in accordance with the teachings of the invention can be used.

Figure 9:
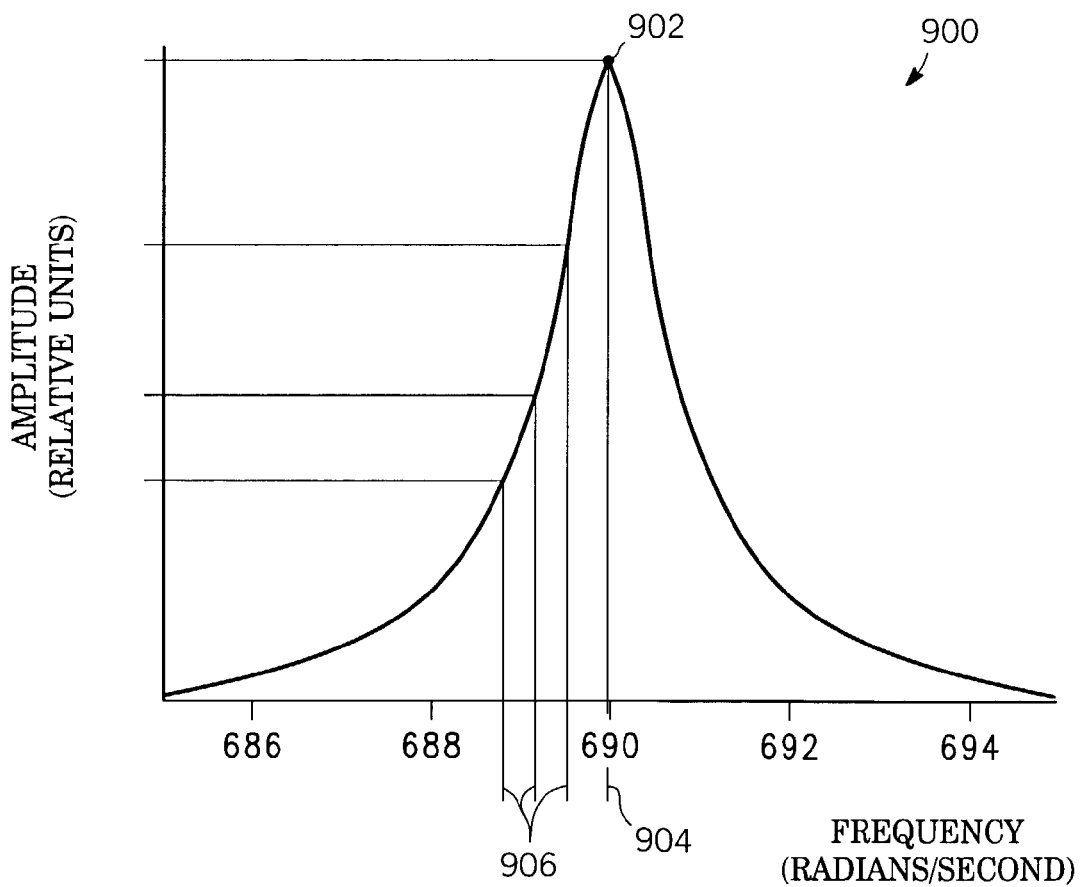
FIG. 9 is an illustrative plot of vibration amplitude versus driving frequency for the piezoelectric electromechanical transducer shown in FIGS. 4, 5.

FIG. 9 shows an illustrative plot 902 of vibration amplitude versus driving frequency for the piezoelectric electromechanical transducer 212 shown in FIG. 4. The abscissa of the plot 902 indicates frequency in relative units. The ordinate of the plot 902 indicates corresponding vibration amplitude. The plot exhibits a resonance characterized by a center frequency that is indicated by reference numeral 904. The resonance is also characterized by a full width at half max (FWHM). A series of frequencies 906 below the center frequency 904 correspond to a set of amplitudes. (A series of frequencies above the center frequency 904 would also correspond to a series of amplitudes.) Below the center frequency 904, amplitude monotonically increases as a function of frequency. The amplitude of response of the transducer 212 can be controlled by controlling a frequency with which the transducer 212 is driven. A vibration melody is preferably characterized by at least a time dependent vibration amplitude. Alternatively, vibration melodies can include varying vibration frequencies. One method of obtaining varying vibration amplitude accompanied by small variations in vibration frequency is to drive the transducer 212 with a frequency selected from a set of closely spaced frequencies including the center frequency 904 and the series of frequencies 906 below the center frequency. Operating in the vicinity of the center frequency 902 allows amplitude to be encoded as a specified frequency. Vibration melodies preferably include frequency components that are within a frequency band that is centered at the center frequency 904 of the transducer 212 and is three times the FWHM wide. More preferably, vibration melodies are preferably substantially contained (in terms of proportion of signal energy) within the three times FWHM range.

Figure 10:
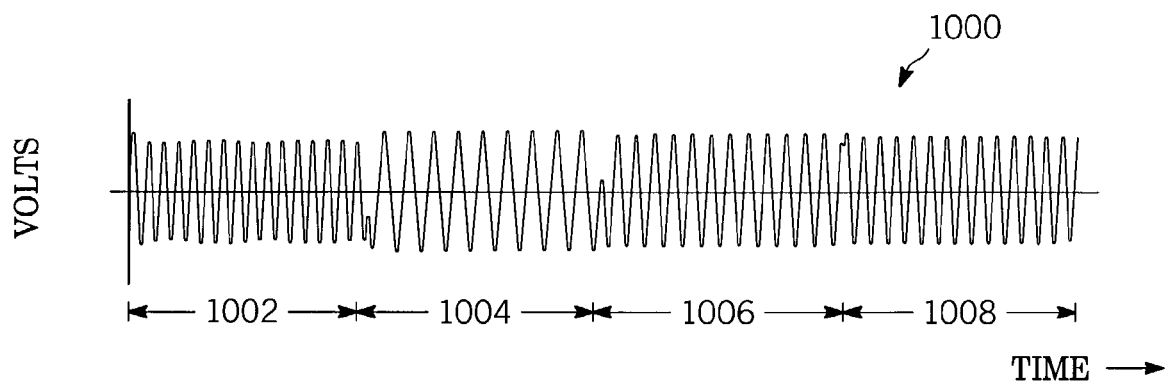
FIG. 10 is an illustrative plot of a frequency modulated drive signal for the piezoelectric electromechanical transducer shown in FIGS. 4, 5.

FIG. 10 is an illustrative plot 1000 of a frequency modulated drive signal for the piezoelectric electromechanical transducer shown in FIG. 4. The illustrated frequency modulated drive signal is a portion of a vibration melody. The abscissa of the plot 1000 indicates time, and the ordinate indicates voltage. The time domain of the plot 1000 includes four successive periods 1002, 1004, 1006, 1008. During each of the four successive periods 1002, 1004, 1006, 1008 the drive signal is characterized by a different frequency. The frequency of the first period 1002 is the center frequency 904 of the resonance of the transducer 212, and the frequencies of the remaining periods are selected from the series of frequencies 906 below the center frequency 904. When the transducer 212 is driven with the signal illustrated in the plot 1000, the amplitude of the vibration of the transducer will change from one period to the next. The signal illustrated in the plot 1000 corresponds to the output of the low pass filter 706 (FIG. 7).

A vibration melody can be transmitted in an encoded format that includes a series of pairs of values. A first value in each pair specifies a frequency (preferably one of the frequencies 904, 906 in the vicinity of the resonance of the transducer 212) and a second value in each pair specifies a duration for which the specified frequency is to be output. Such an encoded format can be used to transmit the vibration melody from the multimedia message server 102 to the client device 106. At the client device 106 the encoded format is decoded by the processor 604, and the processor then supplies the vibration melody to the transducer driver 610. Other encoding and compression can also be used in transmitting the vibration melody.

Figure 11:
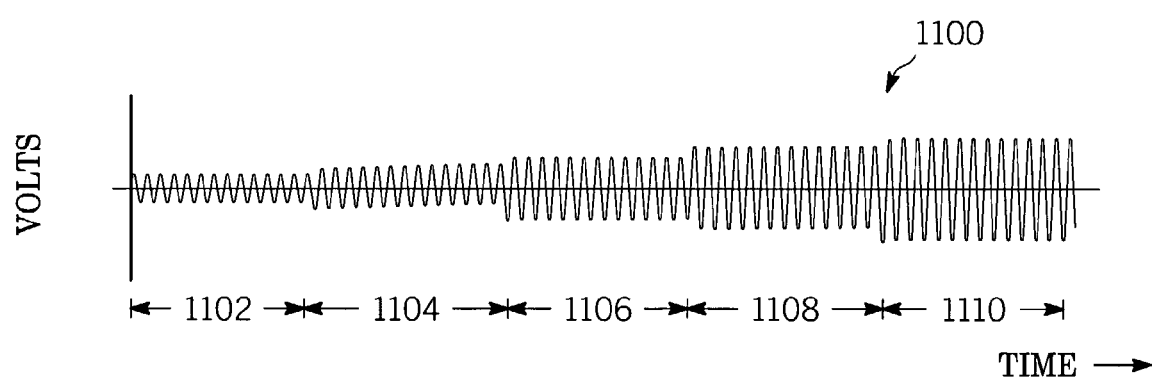
FIG. 11 is an illustrative plot of an amplitude modulated drive signal for the piezoelectric electromechanical transducer shown in FIGS. 4, 5.

FIG. 11 is an illustrative plot 1100 of an amplitude modulated drive signal for the piezoelectric electromechanical transducer 212 shown in FIG. 4. The abscissa of the plot 1100 indicates time, and the ordinate indicates driving voltage. The time domain of the plot 1100 includes five successive periods 1102, 1104, 1106, 1108, 1110. During each of the five successive periods 1102, 1104, 1106, 1108 the drive signal is characterized by a different amplitude. The frequency of the signal is preferably fixed at or near the center frequency 904 of the resonance of the transducer 212. Alternatively, the transducer 212 can be driven with a signal that has a time dependent amplitude and a time dependent frequency. An amplitude modulated vibration melody can be encoded as series of pairs of values. In each such pair, a first value specifies an amplitude, and a second value specifies a duration for which the amplitude is to be output. Alternatively a fixed period can be assumed (by the client device 106), and the amplitude modulated vibration melody can be represented by a sequence of amplitude values each of which are to be output for a duration equal to the fixed period.

Figure 12:
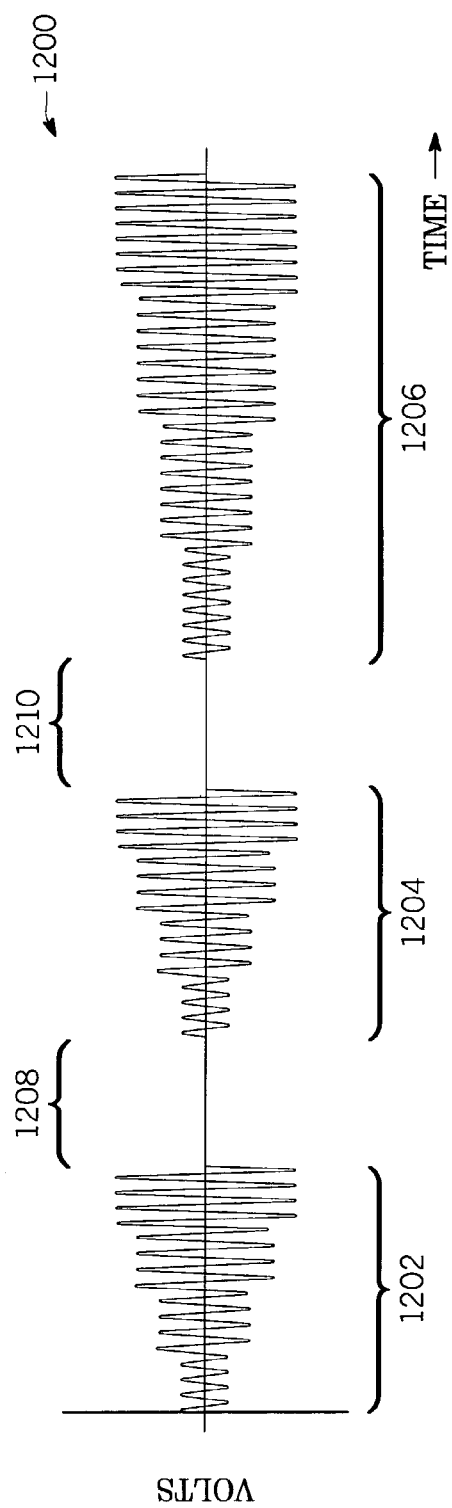
FIG. 12 is a plot of a vibration melody for driving the piezoelectric electromechanical transducer shown in FIGS. 4, 5.

FIG. 12 is a plot 1200 of a vibration melody for driving the piezoelectric electromechanical transducer shown in FIG. 4. The vibration melody comprises three active portions 1202, 1204, 1206 that are spaced apart by two null periods 1208, 1210. During each of the aforementioned active portions 1202, 1204, 1206, vibration amplitude increases monotonically in three steps. Four different amplitudes are used during each of the three portions 1202, 1204, 1206. The first two portions 1202, 1204 have a shorter duration compared to the third portion 1206.

Owing to resonance effects, the amplitude envelope of the transducer 212, can be somewhat smoother than the abrupt steps in amplitude of the drive signal. In response to the vibration melody driving signal illustrated in FIG. 12, the transducer will exhibit a vibration that monotonically increases and drops back to zero three times. The illustrated vibration melody simulates a motorcycle being revved up three times. A user carrying the client device 106 will feel simulated revving of a motorcycle.

By way of example, in a multimedia advertisement, the vibration melody illustrated in FIG. 12, can be accompanied by an acoustic segment that includes an advertising slogan that promotes a particular brand of motorcycle along with background music, and visual media, that presents the slogan as text, and includes a picture of a motorcycle. The acoustic segment is preferably used to drive the transducer 212, at least partially concurrently with the vibration melody being used to drive the transducer. The visual media is also presented at least partially concurrently with the vibration melody and the acoustic segment. The visual media is presented on the display 206. The concurrent use of the vibration melody, acoustic segment, and visual media is effective in attracting the user's attention to the advertisement.

Figure 13:
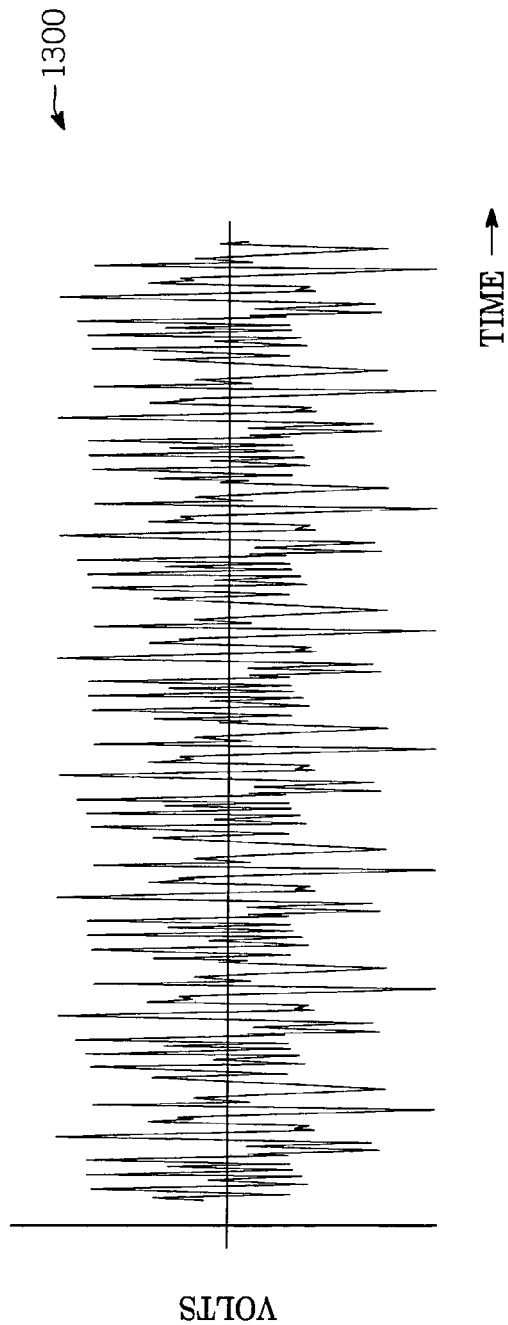
FIG. 13 is a plot of an audio segment for driving the piezoelectric electromechanical transducer shown in FIGS. 4, 5.

FIG. 13 is a plot 1300 of an audio segment. In the plot 1300, the abscissa is a time axis, and the ordinate indicates voltage. The time axes in FIGS. 10-13 are not to scale. The audio segment 1300 is preferably used to drive the transducer 212 concurrently with a vibration melody, such as the vibration melody illustrated in FIG. 12. The audio segment is preferably band limited, so as to exclude frequencies in the vicinity of the center frequency 904 of the resonance of the transducer 212 that is excited by the vibration melody. Exclusion of such frequencies avoids unintentionally exciting the resonance of the transducer 212, and interfering with the vibration melody. Parenthetically, as stated above with reference to FIG. 8, the vibration melody and the acoustic segment can be combined while still in digital form, in which case the resulting sum signal with include frequency components associated with the vibration melody.

Figure 14:
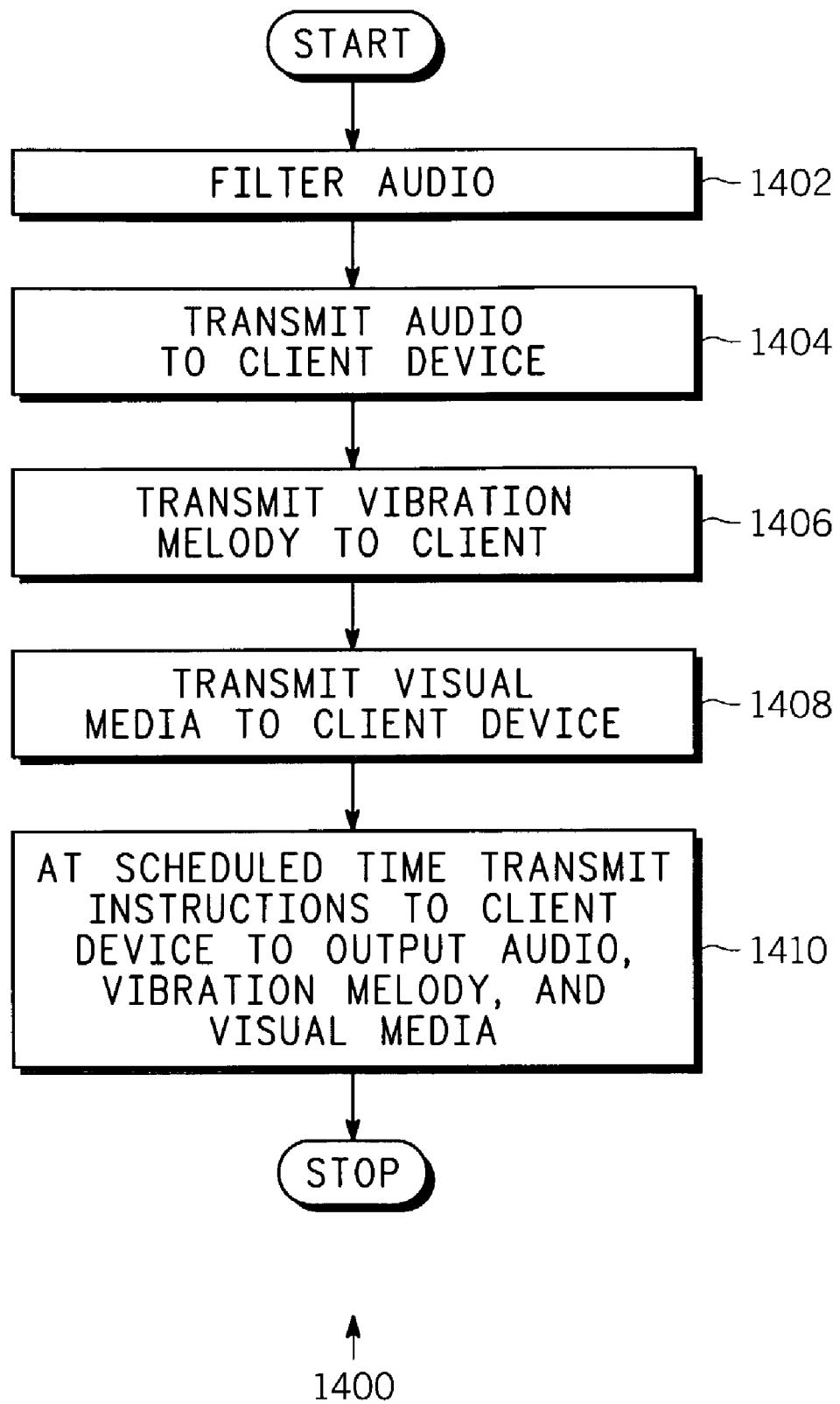
FIG. 14 is a flow chart of a process performed by the multimedia message server shown in FIG. 1 according to the preferred embodiment of the invention.

FIG. 14 is a flow chart 1400 of a process performed by the multimedia message server 102 shown in FIG. 1 according to the preferred embodiment of the invention. In step 1402 an audio segment is filtered to substantially reduce or remove frequency components in the vicinity of the center frequency 904 of the resonance of the transducer 212 that is excited by the vibration melody (i.e. frequency components that overlap the vibration melody). Alternatively the step 1402 can be performed using a separate computer, or in a separate process. For certain audio segments step 1402 may be unnecessary. In step 1404 the audio segment is transmitted to the client device 106. In step 1406 the vibration melody is transmitted to the client device 106, and in step 1408 visual media is transmitted to the client device 106. The preceding three steps of transmitting 1404, 1406, 1408 are preferably performed at a time of low network 104 utilization, e.g., after midnight. Consequently, the network 104 will not be congested by the transmission of advertising media. In step 1410 at a scheduled time (e.g., during business hours) instructions are transmitted to the client device 106, instructing the client device 106 to output the audio segment, the vibration melody, and the visual media. Thus advertising materials can be caused to be output at times (e.g., during business hours) when they are likely to be presented to the user, without having to utilize the network 104 heavily at such times. Alternatively, the audio segment, vibration melody, and visual media can be sent to the client device 106 at a time at which they are to be output.

FIG. 15 is a flow chart of a process performed by the wireless client device 106 shown in FIGS. 2-3, 6 according to the preferred embodiment of the invention. In step 1502 the audio segment is received via the network 104, and in step 1504 the audio segment is stored. In step 1506 the vibration melody is received, and in step 1508 the vibration melody is stored. In step 1510 the visual media is received, and in step 1512 the visual media is stored. The audio segment, vibration melody, and visual media are preferably stored in the workspace memory 608 in encoded form. The audio segment, vibration melody, and visual media are preferably received from the multimedia message server 102 in encoded form. Alternatively, the various media can be received from disparate sources. In step 1514 instructions to output the audio segment, vibration melody, and visual media are received from the multimedia message server 102. In step 1516 the audio segment is read, in step 1518 the vibration melody is read, and instep 1520 the visual media is read. Reading performed in steps 1516-1520 is preferably from the workspace memory 608. In step 1522 the audio segment is decoded, in step 1524 the visual media is decoded, and in step 1526 the vibration melody is decoded. In step 1528 the decoded audio segment is output to the user. In step 1530 the decoded vibration melody is output to the user, and in step 1532 the decoded visual media is output to the user through the display 206. The vibration melody is preferably output at least partially concurrently with the audio segment being output, and the visual media is preferably output at least partially concurrently with the vibration melody and audio segment being output.

Combinations of steps shown in the flow charts in FIGS. 14 and 15 can be performed concurrently as opposed to sequentially. Multiple subroutines or methods can be used to perform individual steps shown in FIGS. 14 and 15, and/or multiple steps shown in FIGS. 14 and 15 can be performed by a single subroutine or method.

As will be apparent to those of ordinary skill in the pertinent arts, portions of the invention can be implemented in hardware or software or a combination thereof. Programs embodying the invention or portions thereof can be stored on a variety of types of computer readable media including optical disks, hard disk drives, tapes, programmable read only memory chips. Network circuits can also serve temporarily as computer readable media from which programs taught by the present invention are read.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

We claim:
1. A method for operating a communication device in a communication system, the method comprising the steps of:
  receiving a vibration melody through a network;
  receiving an audio segment;
  driving an electromechanical transducer with the audio segment;
  driving the electromechanical transducer with the vibration melody;
  wherein the step of receiving the vibration melody includes the sub-step of:
    receiving the vibration melody in a first encoded form;
  the method further comprises the step of:
    decoding the first encoded form to obtain a decoded version of the vibration melody; and
  the step of driving the electromechanical transducer with the vibration melody includes the sub steps of:
    applying the decoded version of the vibration melody to a filter; and
    coupling an output of the filter to the electromechanical transducer.

2. The method according to claim 1 wherein
  the step of driving the electromechanical transducer with the audio segment, and the step of driving the electromechanical transducer with the vibration melody are performed at least partly concurrently.

3. The method according to claim 1 further comprising the step of:
  receiving an instruction to output the audio segment and the vibration melody, wherein the steps of driving an electromechanical transducer with the audio segment and driving the electromechanical transducer with the vibration melody are performed in response to receiving the instruction.

4. The method according to claim 3 wherein:
  the steps of receiving the audio segment and receiving the vibration melody are performed at a time of low communication network utilization.

5. The method according to claim 1 wherein the sub-step of:
  receiving the vibration melody in the first encoded form includes the sub-step of:
    receiving the vibration melody in a form in which amplitude is encoded as frequency near a resonant frequency of the electromechanical transducer; and
  the step of decoding the first encoded form comprises the sub step of:
    decoding the first encoded form to produce a decoded version of the vibration melody that is characterized by a time varying frequency.

6. The method according to claim 1 wherein the sub-step of coupling the output of the filter to the electromechanical transducer includes the sub-steps of:
  coupling the output of the filter to a first input of a summing amplifier; and
  coupling an output of the summing amplifier to the electromechanical transducer.

7. The method according to claim 6 wherein:
  the step of receiving the audio segment includes the sub-step of:
    receiving the audio segment in a second encoded form;
  the method further comprising the step of:
    decoding the second encoded form to obtain a decoded version of the audio signal; and
  wherein the step of driving an electromechanical transducer with the audio segment includes the sub-step of:
    coupling the decoded version of the audio signal to a second input of the summing amplifier.

8. The method according to claim 1 further comprising the steps of:
  receiving visual media;
  outputting the visual media.

9. The method according to claim 8 wherein the step of outputting the visual media occurs at least partially concurrently with the steps of driving an electromechanical transducer with the audio segment and driving, the electromechanical transducer with the vibration melody.

10. A communication device for use in a communication system, the communication device comprising:
  an electromechanical transducer;
  a receiver for receiving a vibration melody and an audio segment;

an electric circuit coupled to the receiver and the electromechanical transducer for driving the electromechanical transducer with the vibration melody and the audio segment, the electric circuit comprises:

a filter coupled to the electromechanical transducer for filtering the vibration melody with which the electromechanical transducer is driven;

a summing amplifier that includes:
- a first input coupled to the filter for receiving vibration melody;
- a second input for receiving the audio segment;
- and an output coupled to the electromechanical transducer.

11. The communication device according to claim 10 wherein the electric circuit further comprises:

a memory for temporarily storing the vibration melody and the audio segment;

a processor coupled to the receiver, the memory and the summing amplifier for controlling the operation of the communication device, wherein the processor serves read the vibration melody and the audio segment from the memory, and apply the vibration melody and the audio segment to the summing amplifier.

12. The communication device according to claim 10 wherein:

the electromechanical transducer comprises a piezoelectric electromechanical transducer.

13. The communication device according to claim 12 wherein:

the electromechanical transducer is resonant at about a frequency of the vibration melody.

* * * * *